(12) United States Patent
Tikhomirov et al.

(10) Patent No.: US 12,554,532 B1
(45) Date of Patent: Feb. 17, 2026

(54) RESTORATION OF A STATE OF A GROUP OF PROCESSES

(71) Applicant: Virtuozzo International GmbH, Schaffhausen (CH)

(72) Inventors: Pavel Tikhomirov, Kuala Lumpur (MY); Serg Bell, Costa del Sol (SG); Stanislav Protasov, Singapore (SG)

(73) Assignee: Virtuozzo International GmbH, Schaffhausen (CH)

( * ) Notice: Subject to any disclaimer, the term of this patent is extended or adjusted under 35 U.S.C. 154(b) by 440 days.

(21) Appl. No.: 18/331,349

(22) Filed: Jun. 8, 2023

(51) Int. Cl.
*G06F 9/48* (2006.01)
(52) U.S. Cl.
CPC .................................. *G06F 9/485* (2013.01)
(58) Field of Classification Search
CPC ....................................................... G06F 9/485
See application file for complete search history.

(56) References Cited

U.S. PATENT DOCUMENTS

| | | | |
|---|---|---|---|
| 6,389,446 B1 * | 5/2002 | Torii | G06F 8/45 718/100 |
| 9,779,118 B2 | 10/2017 | Shmueli et al. | |
| 10,776,148 B1 | 9/2020 | Zelenov et al. | |
| 2017/0220374 A1 | 8/2017 | Beveridge et al. | |
| 2021/0271499 A1 | 9/2021 | Fong et al. | |
| 2023/0153175 A1 * | 5/2023 | Hursey | G06F 9/5066 718/107 |

FOREIGN PATENT DOCUMENTS

EP 2646923 B1 8/2019

* cited by examiner

*Primary Examiner* — Charlie Sun
(74) *Attorney, Agent, or Firm* — ESPE Legal Consultancy FZ-LLC

(57) ABSTRACT

System and methods for restoring a state of a set of processes, for example, during live migration or restoration from checkpoint of processes or of virtual environments. Systems and methods can restore information and parameters related to the structure of the process tree and relationships between the processes. Processes can be migrated from a source environment to a destination environment. Processes can also be restored corresponding to a certain checkpoint. Systems and methods can restore processes based on information about a parent process and a closest alive born ancestor of each process from the set of processes, such as, for example, information pertaining to a process tree and CABA (closest alive born ancestor) tree from the certain checkpoint.

21 Claims, 12 Drawing Sheets

RESTORATION OF A STATE OF A GROUP OF PROCESSES

TECHNICAL FIELD

The present disclosure generally relates to managing migration of processes. In particular, the present disclosure relates to restoring states of a set of processes.

BACKGROUND

Virtualization technology for computing resources is an advantageous technology with respect to managing large-scale computing resources for many customers with diverse needs. Virtualization allows various computing resources or computing services to be efficiently and securely shared by multiple customers. Typically, virtualization at an OS kernel level provides for several isolated user spaces, i.e., containers. A container may contain everything needed to run a computer program, including a complete file system, code, system tools, and system libraries. A container (CT) may be a type of a virtual environment having isolated processes on a source computer. Containers can be identical to a real server from a user point of view. Each container may have entire OS components except for the kernel. Thus, the applications from different containers cannot interact with each other.

Containers typically have their own sets of user groups, and processes isolated from the source host OS and from other containers. Containers may face scarcity of hardware availability. Therefore, the container or processes running user applications may need to be migrated from one environment to another to achieve high availability (HA) of the service.

In the world of virtualization infrastructure, live migration refers to the migration of the container and/or processes from one source environment to another destination environment. Each source environment can be a hardware server or a virtual server.

Live migration of a container may fail for several reasons. A primary reason for failure can be due to the complicated inner structure of the container. The inner structure may comprise several processes or groups of processes interrelated to each other. The processes can be interdependent on each other, as such, having child-parent relationships among themselves. During live migration, the processes must be restored on the destination environment without even slightly altering the interrelationships of the processes.

There are a few techniques and tools available for live migration. However, such tools are inadequate to restore the groups of processes with complicated interprocess relationships, e.g., child-parent relationships and belonging to sessions. Typically, during restoration of a group of processes from the user space, the processes shall be created in a correct order or sequence as some resources shall be inherited by a child process from its parent process. Also, in the event of a parent process termination, the child process may be reparented to sub-reaper process. Existing live migration tools are unable to determine the exact sequence of the processes creation with respect to interprocess relationships and restore the processes accordingly. Additionally, the existing live migration tools face challenges of indetermination of the order of operations that lead to the exact process tree configuration. Wrong order of operations may lead to structural problems in the future.

Therefore, there is a need for a robust system and method for restoring process trees during live migration.

SUMMARY

The present disclosure relates to systems and methods for restoring a state of a set of processes, for example, during live migration or restoration from checkpoint of processes or of virtual environments. Embodiments are capable of restoring all information and parameters related to structure of the process tree and interposes relationships between the processes.

In an embodiment, a computer implemented method for restoring a set of processes corresponding to the state of processes at a certain checkpoint is disclosed. The processes have parent-child relationships, and also, the processes belong to at least one session.

According to an embodiment, the method comprises obtaining information about a closest alive born ancestor and an original parent of each process from the set of processes at the certain checkpoint, restoring the set of processes, creating a helper process as a parent process of a particular process being restored, if an original parent process of the particular process differs from the closest alive born ancestor of the particular process, and terminating the helper process, wherein terminating comprises reparenting of the particular process from the helper process to the original parent process of the particular process.

In one aspect, a method further comprises creating a helper session leader as a child process of the closest common alive born ancestor of session processes, if the session does not have a session leader, including creating a session by the helper session leader, and creating by the helper session leader at least one child process of the closest common alive born ancestor of the session processes, when the child process has at least one session process as a descendant or when the child process belongs to the session.

In one aspect, each process in the set of processes was alive at the certain checkpoint.

In one aspect, a method further comprises assigning an original parent process of the particular process as a sub-reaper for reparenting of the particular process before terminating the helper process, wherein the helper process is currently a parent process of the particular process.

In an embodiment, computer implemented method for restoring a set of processes on a destination environment corresponding to a state of the set of processes from a source environment at a certain checkpoint, wherein processes have parent-child relationships, and wherein processes belong to at least one session, comprises collecting information pertaining to a process tree and process relation structure from the source environment at the certain checkpoint, restoring the set of processes at the destination environment including restoring the set of processes in accordance with the process relation structure, creating a helper process as a parent process of a particular process, if a parent process of the particular process from the process tree differs from a closest ancestor of the particular process from the process relation structure, creating a helper session leader as a child process of a closest common ancestor of session processes from the process relation structure, if session does not have a session leader, including by creating a session by the helper session leader, and creating by the helper session leader at least one child process of the closest common ancestor of the session processes, when the child process has at least one session process as a descendant or when the child process belongs to the session, assigning a parent process of the particular process in accordance with the process tree as a sub-reaper for the particular process reparenting, wherein the helper process is currently a parent process of the particular process, and terminating the helper process and the helper session leader.

In one aspect, the process relation structure is a closest alive born ancestor (CABA) tree, wherein each node of the CABA tree describes a process, characterized by process id and session id, and wherein relation of the nodes of the CABA tree characterizes a real order of process creation.

In one aspect, each node of the CABA tree comprises information about threads of the process corresponding to the node.

In one aspect, a closest alive born ancestor of the node in the CABA tree is a closest alive born ancestor for all threads of the process corresponding to the node.

In one aspect, restoring the set of processes further comprises creating threads in accordance with the process relation structure.

In one aspect, the particular processes being reparented becomes a child process of a first alive thread of the sub-reaper.

In one aspect, a method further comprises forming the CABA tree from a start of a first process in the set of processes until the certain checkpoint by creating a new node of the CABA tree, when a new process is created, wherein the closest alive born ancestor of the new node is a parent process of the new process and/or a process that has created the new process, and deleting the node, when the corresponding process is killed, wherein the closest alive born ancestor of the deleted node becomes the closest alive born ancestor of the closest alive born descendants of the deleted node in the process relation structure.

In one aspect, the CABA tree is maintained in user space of the source environment.

In one aspect, deleting the node is performed after a killed process identifier is freed.

In one aspect, the environment is at least one of a container, a virtual machine, or a hardware server.

In an embodiment, a system for restoring a set of processes corresponding to the state of a set processes at a certain checkpoint is disclosed. Processes have parent-child relationships, and the processes belong to at least one session.

In some embodiments, the system comprises a state control unit communicatively coupled to a source environment and configured to collect information about a closest alive born ancestor and an original parent of each process from the set of processes at the certain checkpoint, a process restoration unit communicatively coupled to a destination environment and configured to restore the set of processes, wherein each process of the set of processes was alive at the certain check point, create a helper process as a parent process of a particular process being restored, if an original parent process of the particular process differs from the closest alive born ancestor of the particular process, and terminate the helper process, wherein terminating comprises reparenting of the particular process from the helper process to the original parent process of the particular process.

DETAILED DESCRIPTION

Figure 1:
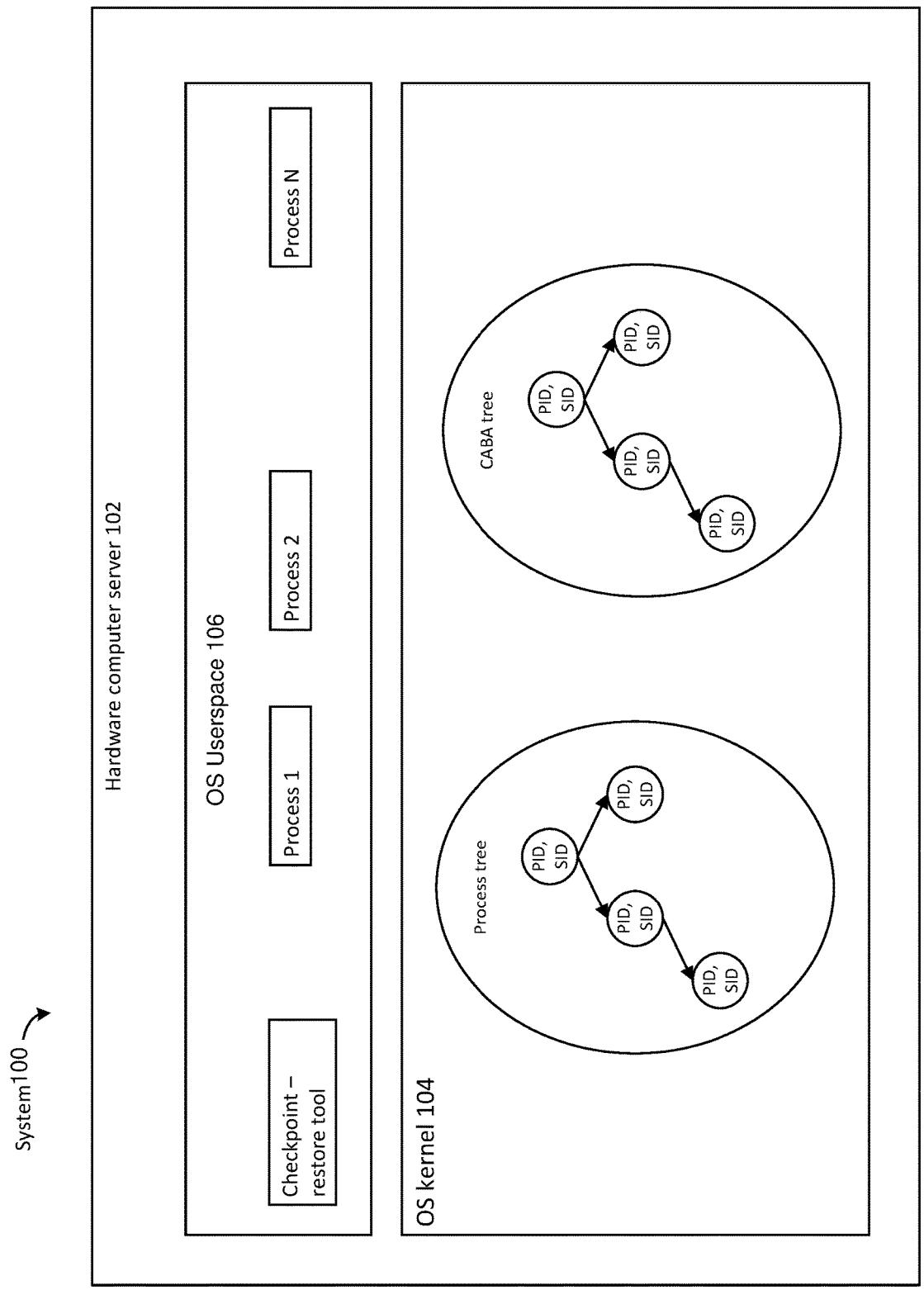
FIG. 1 is a block diagram of a system having a process tree and a CABA tree, in accordance with an embodiment.

The present disclosure relates to restoration of a process tree state during live migration of a group of processes.

The term "Live Migration" may refer to the process of moving a process, a group of processes, container, a virtual machine (VM) or etc. running on one source to another source without disrupting normal operations or causing any downtime or other adverse effects for the end user. Live migration involves saving a state of the process (such as memory of the process and the information from kernel structures describing the process). As one example, the state of the process may be saved in a file. Then the process may be restored, such as new process is created having the same state (e.g., as saved in the file). During Live Migration of a group of processes (GP), the state of each process shall be restored, including interprocess relationships. Particularly, states of process and corresponding kernel structures describing the processes of the source server shall be saved and new processes with the same state are created at the destination server.

The present disclosure relates to groups of processes being restored. In one embodiment, the group of processes may comprise processes of a virtual environment, e.g. a container or a virtual machine; or may comprise processes of an application; or may comprise any kind of processes, wherein at least some processes are related (e.g., child-parent relations, belonging to one session/namespace/control group, etc., or communication with each other, etc.) to each other.

According to one aspect of the disclosure, a Virtual Environment (VE) is a type of isolated environment that supports program code execution. Examples of VEs can be any kind of virtual machines (VMs, including lite VMs), containers (including OS containers, stateless containers, or execution containers), and the like. In some aspects, from the point of view of the user or a process running in the VE, the code in a virtual execution environment (VE) runs as if it were running on the real computing system. In one aspect, at least a part of the real hardware or software utilized for running program code are presented in the VE as their virtual analogs.

According to one aspect of the disclosure, a Virtual Machine (VM) is a type of a VE. In one aspect, several VMs may be running on the same physical machine simultaneously, wherein hardware resources are virtualized. In one aspect, each Virtual Machine instance executes its own OS kernel (i.e., guest OS kernel). In one aspect, support of Virtual Machines is implemented using a Virtual Machine Monitor and/or a Hypervisor. In one aspect, a VM with a guest OS inside is presented by one process in the host OS.

According to one aspect of the disclosure, a container (CT) (e.g., including OS containers, stateless containers, or execution containers) is an isolated environment (e.g., a type of virtual environment) that supports program code execution. In some aspects, a container comprises a group of processes isolated from other processes running on the computing device. In some aspects, isolation of containers is implemented on the namespace level. In some aspects, containers running on the same computing device share the OS kernel of the computing device and at least some of the system resources. In some aspects, multiple sets of applications or services are organized on a single hardware system by placing them into isolated containers.

In one aspect, a container may refer to an isolated group of processes. In one aspect, container may be a lightweight software package that contain all the dependencies required to execute the contained software application, wherein dependencies comprise things like system libraries, external third-party code packages, and other applications.

The term "session leader" refers to a process that has created a new session. For such a process, Process Identifier (PID)=Session Identifier (SID). The session will be inherited by its child processes created after the session creation.

The term "reaper" (and its variation-"sub-reaper") refers to a process that can handle child processes of its killed descendants. Using system calls, a process can ask to be or not to be a sub-reaper.

The term "reparent" refers to assigning of a new parent process to the child process, where a parent process of the child process in a process tree is terminated, and the child process is assigned with a new parent process which is the nearest reaper process (for example, an init or a sub-reaper). The term "reparenting" refers to an operation of reparenting. In one embodiment, the nearest reaper is taken from the same namespace as a namespace of the process being killed.

The term "CABA" denotes the Closest Alive Born Ancestor (CABA) of a given process.

The term "CABD" denotes the Closest Alive Born Descendant (CABD) of a given process. Those alive closest descendants that were really born and were not reparented.

The term "process tree" denotes a data structure describing a set of related processes and their child-parent relations. In one aspect, the term is also used to denote the set of related processes themselves. In one embodiment, the process tree is a kernel data structure describing processes running in the system and their parent-child relationships. In one embodiment, the process tree may show parent-child relationship, belonging-to sessions, namespaces, control groups (cgroups), etc.

FIG. 1 is a block diagram of a system 100 for restoring a set of processes. The system 100 is implemented on a hardware computer server which may comprise, but may not be limited to, an Operating System (OS) (comprising an OS kernel and an OS user space).

In one embodiment, the OS kernel 104 is a computer program at the core of a computer's operating system and generally has complete control over all components in the system 100. In one embodiment, the OS kernel 104 is the portion of the operating system code that facilitates interactions between hardware and software components. In one embodiment, the OS kernel 104 stores a process tree.

In one embodiment, a process is an instance of a computer program that is being executed. In one embodiment, a process may comprise one or more threads each comprising a sequence of instructions executing in an address space of the process. The execution of a process or thread may create additional processes or threads. Creating an additional process or thread may comprise causing the new process or thread to launch, injecting new instructions into an already executing process or thread, or modifying instructions in an existing process or thread.

In one embodiment, processes can be structured in accordance with the interprocess relationship with each other as a process tree. In one embodiment, each process node of the tree may store the information related to the process and the parameters associated with the process (e.g., describing the state of the process, or relationships with other processes, etc.).

In the process tree, each process node corresponds to a different process and the branches represent relationships between the processes. A root process node in the process tree corresponds to a root process (e.g., a first process of a group of processes, e.g., ancestor of other processes, e.g., an init, etc.). In one embodiment, other than the root process node, each process node in the process tree is connected to its corresponding parent process node (e.g., to a parent process node from which the process node was created, or to which the process node has been reparented). In another embodiment, there may be other process nodes, without a parent-they will correspond, for example, to processes which entered a namespace after a container creation. A given process node in the process tree may also be connected to one or more child process nodes corresponding to one or more child processes, which were created by the process or which were reparented to the process.

In one embodiment, the process tree may store process identifiers. A process tree may be used to indicate interprocess relationships between each of the processes in a group of processes which the tree or a subtree is describing (such showing a parent, a grandparent, a great grandparent processes, children, etc. of a current process).

The process identifier is also known as process ID or PID. PID is a unique number to identify each process running in an operating system such as LINUX, WINDOWS, and UNIX. PIDs are reused over time and can only identify a process during the lifetime of the process, so a process ID does not identify processes that are no longer running and whose PID has been released.

Embodiments of process trees may depict a parent-child relationship, belonging to sessions, namespaces, control groups (cgroups), etc. The session identifier, referred to as a session ID or SID hereinafter, is the unique identity of the corresponding session. As shown in FIG. 1, each process node in the process tree comprises at least PID and SID of a respective process and session. In one embodiment, the process tree may be stored in OS user space 106, in another embodiment-in OS kernel 104.

In one embodiment, the system 100 further comprises a process relation structure. In one embodiment, the process relation structure may be stored in OS user space 106, in another-in OS kernel 104. In an embodiment, in the process relation structure, all processes are structured in accordance with interprocess relationships between the processes. Each process node may comprise PID and SID along with the information and parameters corresponding to the process. In one embodiment, the process relation structure is a Closest Alive Born Ancestral (CABA) tree. On the FIG. 1, relation of the nodes of the CABA tree characterizes a real order of processes creation.

A significant difference between the process tree and the CABA tree is that, in the process tree, upon termination of a parent process, all child processes are reparented to the nearest ancestor sub-reaper. However, in the CABA tree, the child processes are reparented to the closest alive born ancestor (CABA) of the process being terminated. In one embodiment, CABA tree comprises information about the threads of the process corresponding to the node in CABA tree. In one embodiment, the closest alive born ancestor of the node of the CABA tree is a closest alive born ancestor for all threads of the process corresponding to the node in CABA tree. CABA tree is described in detail with reference to subsequent figures.

Checkpoint-is a saved state of a process or a set of processes at a particular moment, including processes memory contents and information about interprocess relationships. In one embodiment, such information may be about the current parent and children of each process according to the OS process tree, process's session, CABA, and CABDs. In one embodiment, the term "checkpoint" also denotes a process of saving the state of a group of processes.

In one embodiment, the checkpoint corresponds to a particular moment of time, event or predefined conditions characterizing the state of the source environment. In an embodiment, when the processes need to be restored or migrated they are restored from the checkpoint. In an embodiment, the process structures and process states, including the process tree and CABA tree are stored for the particular checkpoint and then are used to restore processes on the destination environment during migration or on the source environment during restoration to the same state corresponding to the checkpoint.

In certain embodiments, collaborative checkpointing can be utilized such that the state of the source environment can be determined from a plurality of checkpoints. For example, fragments of the state of the processes and their interprocess relationship, corresponding to particular timestamp, event or predefined conditions characterizing the state of the source environment stored across two or more checkpoints (e.g., stored in several files) can be utilized to determine the state of the source environment.

In embodiments, the OS kernel 104 space is reserved for running privileged operating system components, such as OS kernel and some device drivers, etc. In contrast, OS user space 106 is the memory area where application software and certain other drivers execute. The term user space also refers to all code that runs outside the operating system's kernel. The processes running in the OS user space 106 may be referenced in the CABA tree in one embodiment.

In one embodiment, the systems and methods may be implemented on a computing device having at least one processor and memory. In one embodiment, the computing device may comprise several computing devices, for example communicatively coupled via a network, that may implement the various techniques described herein. In one embodiment, the systems and methods may be implemented on several computing devices.

In one embodiment, the operations of the methods may be performed entirely by one processor. In another embodiment, some operations are performed by one processor, and other operations of the same method are performed by other processors (e.g., belonging to the same or to other computing devices). In one embodiment, at least some operations of the methods may be performed by several processors (e.g., simultaneously, or sequentially, or etc.).

In one embodiment, a computing device may include a processing system (e.g., one or more processors), one or more computer-readable media (e.g., memory, disk, etc.), and one or more I/O interfaces that are communicatively coupled, one to another.

In one embodiment, the processing system may have one or more processors (e.g., a central processing unit (CPU), etc.) implemented in hardware. In one embodiment, a computing device may be a multiprocessor system (e.g., having a set of processors united by a non-uniform memory access (NUMA) architecture).

In one embodiment, the computer-readable media may store information such as computer readable instructions, data structures, program modules, or other data.

In one embodiment, a computing device may also include any kind of peripheral devices, including but not limiting to, network adapters, storage devices, etc.

In one embodiment, a computing device may comprise any kind of persistent and/or non-persistent, volatile and/or non-volatile, fixed and/or removable memory (e.g., a random access memory) and storage (e.g., hard disks, SSD disks, a network storage, etc.).

In one embodiment, a computing device may comprise an input/output (I/O) controller, a memory controller, a bus that couples various components including the memory to the at least one processing unit, I/O slots, etc.

In one embodiment, a computing device may be, for example, a server, a desktop, a laptop, a mainframe, a mobile device, a server of a service provider, a device associated with a client (e.g., a client device), an on-chip system, and/or any other suitable computing device or computing system.

In one embodiment, a computing device may be a single device, or a set of several computing devices, or a part of a cluster, or a part of a distributed system, or a part of a cloud, etc.

In one embodiment, a computing device may be connected to other devices via a network.

In one embodiment, processor-executable instructions are stored in memory and executed by at least one processor to perform the operations of the methods.

In one embodiment, an implementation of the described methods and techniques may be stored on or transmitted across various forms of computer-readable media.

In one embodiment, the computing device may execute an operating system (OS). The OS may have an OS kernel and user space processes.

In one embodiment, the computing device may also execute VEs and even nested VEs (those that are residing inside of other VEs).

In one embodiment, the systems and methods may be implemented on the computing device directly, or inside of a VE running on the computing device.

While the various actions in described methods are discussed in a particular order, it is to be appreciated that the actions can be performed in different orders than those depicted and at least some of the actions may be performed concurrently with one another.

Figure 2:
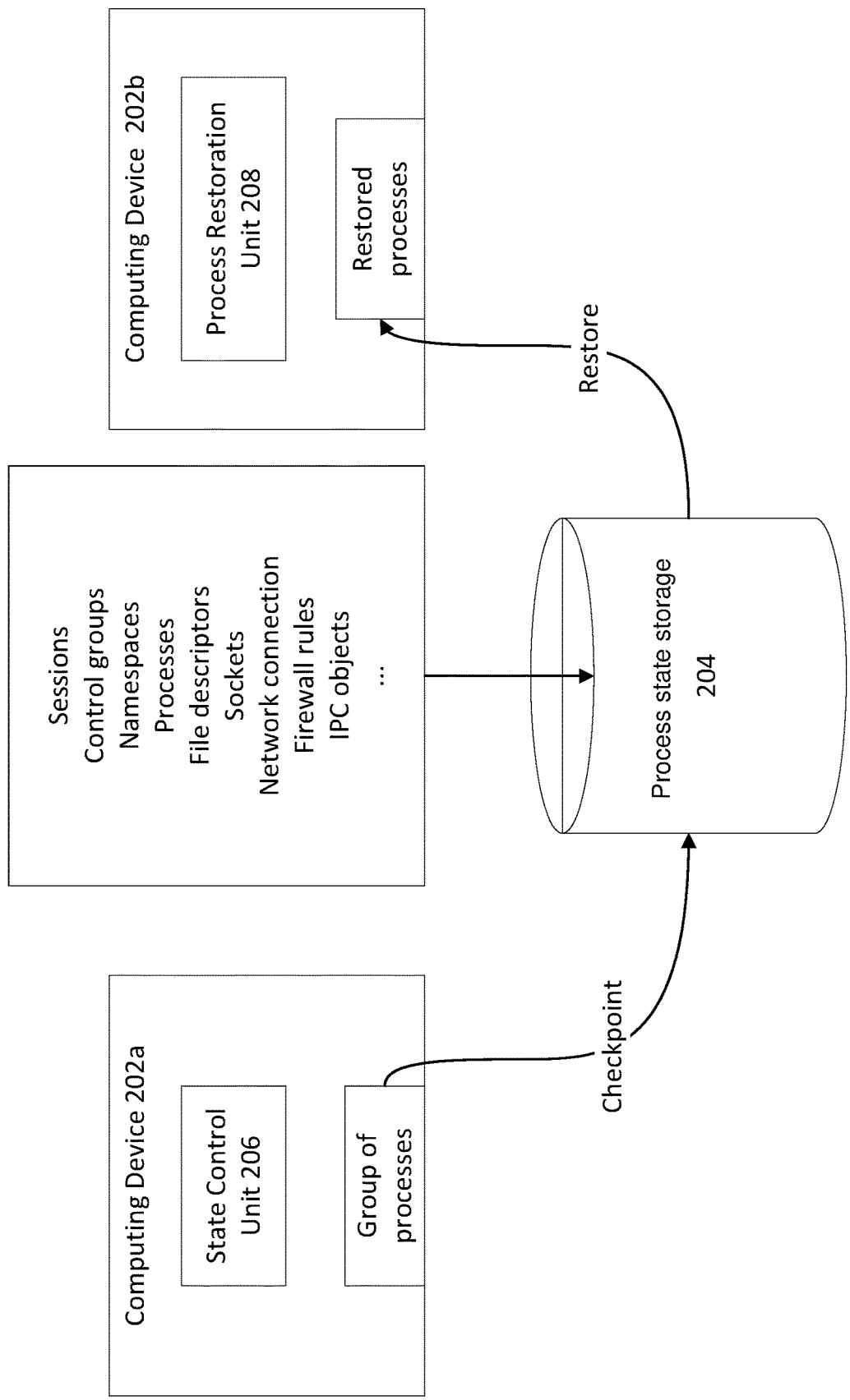
FIG. 2 is a block diagram of a live migration operation of a group of processes, in accordance with an embodiment.

FIG. 2 is a block diagram of a live migration operation of a group of processes, in accordance with an embodiment. In one embodiment, the migration operation may consist of a checkpoint operation-collecting processes' states (e.g., creation of a checkpoint), and a restore operation-creation of new processes having the same states. The migration operation can be performed in an environment, where the environment is at least one of a container, a virtual machine, or a hardware server. As illustrated in FIG. 2, the migration operation can involve a first computing device 202a-source, a second computing device 202b-destination. In different embodiments, computing device 202a-source may be the same computing device 202b-destination (e.g., in case where restoring of processes from checkpoint is performed on the same host). In one embodiment, a checkpoint is saved as a file in process state storage 204, that can be a part of a source 202a or a destination device 202b, or a dedicated device. In other embodiments, checkpoint is directly transferred from the source to the destination. In other embodiments, a checkpoint is not saved as a file but is written to a memory area at source device 202a and/or destination device 202b.

The first computing device 202a may be a source server where a set of processes, which needs to be migrated, run. A second computing device 202b may be a destination server where the set of processes from the first computing device 202a needs to be restored. The first computing device 202a and the second computing device 202b comprises, but may not be limited to, general purpose functional components, such as processor, system memory, input/output (I/O) controller and network interface. The computing devices 202a and 202b in another embodiment can represent virtual machines or containers, running on virtual machines or a hardware server.

The first computing device 202a is the source environment, where a set of processes run. The second computing device 202b is the destination environment for restoration of the processes. In one embodiment, the source environment comprises a state control unit 206, and the destination environment comprises a process restoration unit 208. In one exemplary embodiment, the state control unit 206 and/or the process restoration unit 208 may be represented by a checkpoint restore in userspace tool (CRIU), and may run in user space of the source or the destination environment. The state control unit 206 is communicatively coupled to the source environment and configured to collect information about a closest alive born ancestor and a current parent of each process from the set of processes. In one aspect the state control unit 206 creates a checkpoint containing collected information. For example, source state of each process, information, and parameters, and interprocess relationships may be collected by the state control unit 206. In one aspect, the collected information may be stored in a process state storage 204 (part of a memory, a virtual disk, a hard disk or such memory storing devices). The state of the process and corresponding parameters are collected and saved to ensure that the process tree is restored in the correct sequence without altering any characteristic of any process or any characteristic of the interprocess relationships. In one embodiment, the set of processes may represent a virtual environment, for example, a container. Accordingly, the state of the set of processes can include information related to sessions, control groups, namespaces, processes, file descriptors, sockets, network connections, firewall rules, IPC objects, etc. Other information related to computing device 202a and/or second computing device 202b can also be used. In one embodiment, the information related to the process state and parent process of each process is collected.

In an embodiment, the state control unit 206 and process restoration unit 208 are installed on a single device to create a checkpoint and restore processes on the same device to the state corresponding to the checkpoint.

In one embodiment, the computing device 202a (e.g., an OS kernel on it, or a state control unit 206, etc.) is further configured to form the CABA tree from the start of the first process of the set of processes (e.g., an init process of a container) until the certain checkpoint. The CABA tree is formed by, firstly, creating a new node of the CABA tree, when the new process is created. In one embodiment, in most cases the closest alive born ancestor of the new node is a parent process of corresponding created process in the process tree. In such embodiment, when a new process is created, the process node is added to process tree and CABA tree, and a parent of the new process in the process tree and CABA of the new process in the CABA tree are mostly the same process (e.g., a process that gave birth to the new process; or a process or a thread that is chosen according to logic of used system call; though for some special system calls parent in the process tree and CABA may be different). Secondly, a node can be deleted, when the corresponding process is killed. In an embodiment, the node is deleted after the killed process is released. The closest alive born ancestor of the deleted node becomes the closest alive born ancestor of nodes corresponding to the closest alive born descendants of the killed process in the CABA tree.

FIG. 2 further illustrates a source environment having a group of processes, which need to be migrated or restored at the destination environment. In one embodiment, additionally, the state of each process of the group of processes is copied and saved at the memory, disk, storage or a database, etc. In one embodiment, the process tree is sent to and restored at the destination environment by the process restoration unit 208. The process restoration unit 208 is communicatively coupled to the destination environment. The process restoration unit 208 is configured to restore processes in accordance with the process relation structure (e.g., CABA). The process restoration unit 208 is further configured to create helper processes. For example, if an original parent process of a particular process (e.g., collected previously from process tree) differs from the closest born alive ancestor of the particular process (e.g., from the process relation structure), the helper process is created as a parent process of the particular process (e.g., the helper process during restore creates the particular process).

In one embodiment, the process restoration unit is further configured to create a helper session leader. For example, if a session does not have a session leader, the process restoration unit is configured to create a helper session leader process for the session. The helper session leader is created as a child process of the closest common ancestor of all processes of a session. Then the helper session leader creates a session and creates one or more child processes that will inherit the same session.

In one embodiment, the process restoration unit 208 is further configured to terminate helper processes. In one embodiment, helper processes are killed starting from leaves to the root so that reparent operations would create the original process tree. In an embodiment, processes are made sub-reapers or not sub-reapers in order to achieve original interprocess relationships, which took place in the original process tree. In an embodiment, before the helper process is terminated, a process to which child processes of the helper process shall be reparented is made a sub-reaper. In one embodiment, the process restoration unit 208 is further configured to terminate helper session leader processes. When the helper session leader is being terminated, its child processes (if there are still any) are reparented to the CABA of the helper session leader.

Figure 3:
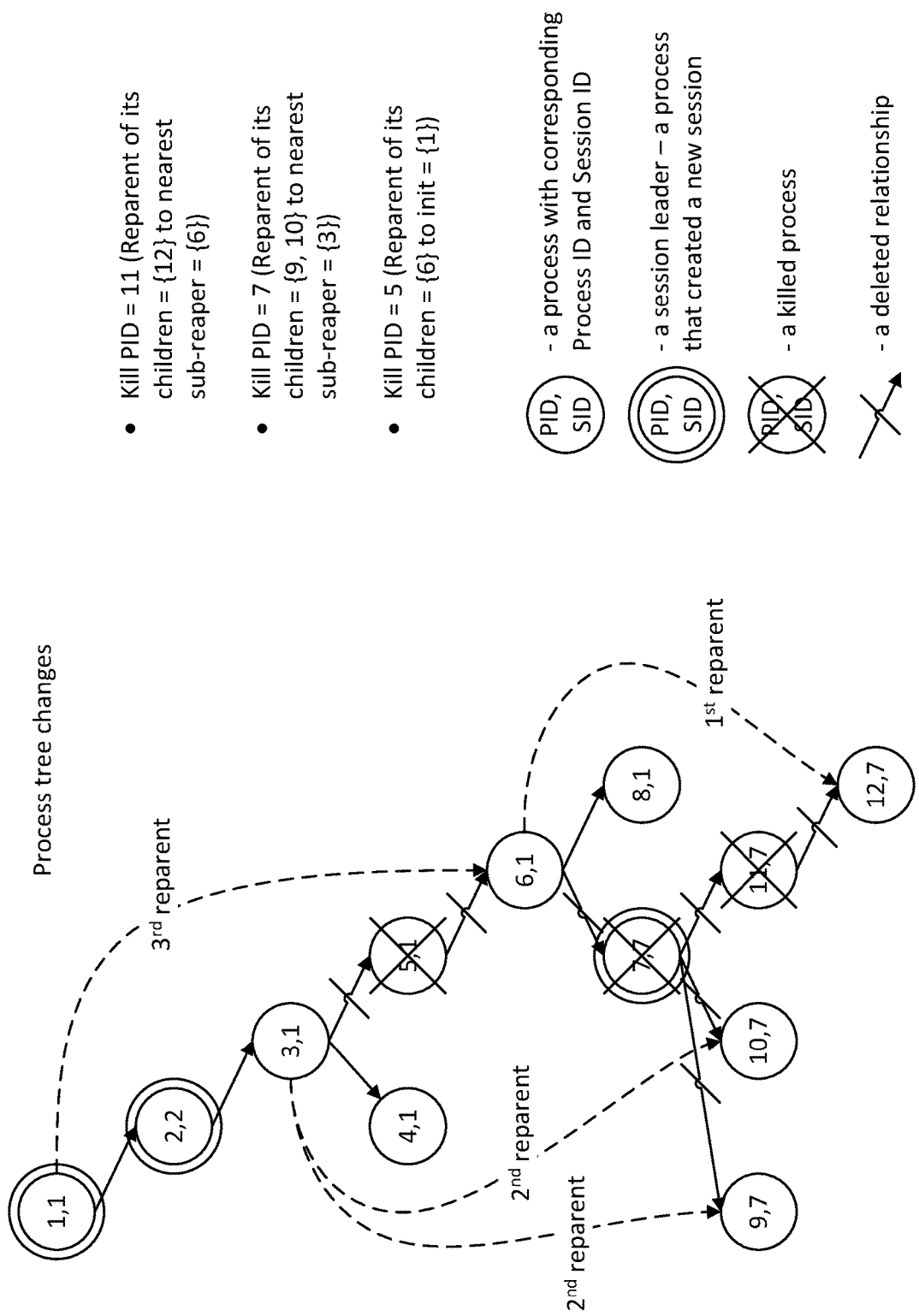
FIG. 3 is a block diagram of process tree modifications corresponding to an exemplary first group of processes.

FIG. 3 is a block diagram of process tree modifications corresponding to an exemplary first group of processes. In this example, the following configuration of the process tree is assumed.

First, a total of 12 processes are created: a process with Process ID (PID)=1 is a session leader of a session with Session ID (SID)=1; PID 1 created (e.g., by fork ( ) system call) a process with PID 2. PID 2 inherited the session with SID=1, PID 2 then created PID 3 (so PID 3 inherited session 1) and after that PID 2 created a session with SID=2. PID 3 created processes with PID 4 and PID 5, both of them inherited session SID 1. PID 5 created a process with PID 6, which inherited the session with SID 1. PID 6 created the processes with PID=7 and PID=8, which both inherited the session with SID=1. PID 7 then created a new session with SID=7 and thus became a session leader of the session with SID=7; after that PID 7 created processes PID 9, PID 10 and PID 11, which inherited the session SID 7. PID 11 created a process with PID 12.

As a result of processes creation, Process ID (PID) 1 is a root node in the process tree, PID 2, is a child process of PID 1. Additionally, PID 1 and PID 2 are the session leaders: PID 1 is a leader of a session with Session ID (SID) 1, and PID 2 has created a session with SID 2 and is the session leader of the session with SID 2. PID 3 is a child process of PID 2 and a parent process of PID 4 and PID 5. PID 5 is the parent process of PID 6 which is the parent process of PID 7 and PID 8. PID 7 is a session leader of a session with SID 7 and the parent process of PID 9, PID 10, and PID 11. PID 11 is the parent process of PID 12.

Then, in one exemplary situation, three processes (PID 11, PID 7, and PID 5) are terminated one by one. When a process is terminated, the corresponding node is deleted from the process tree and all child processes of the process are reparented to the nearest ancestor sub-reaper. In this example, after all processes were created, PID 6 became a sub-reaper. When PID 11 is killed, its child process (PID 12) is reparented to the nearest sub-reaper (PID 6). Then, PID 6 stopped being a sub-reaper, and PID 3 became a sub-reaper. When PID 7 is killed, its child processes (PID 9 and PID 10) are reparented to the nearest sub-reaper (PID 3). Then, PID 3 stopped being a sub-reaper. When PID 5 is killed, its child process (PID 6) is reparented to initial process (PID 1).

Figure 4:
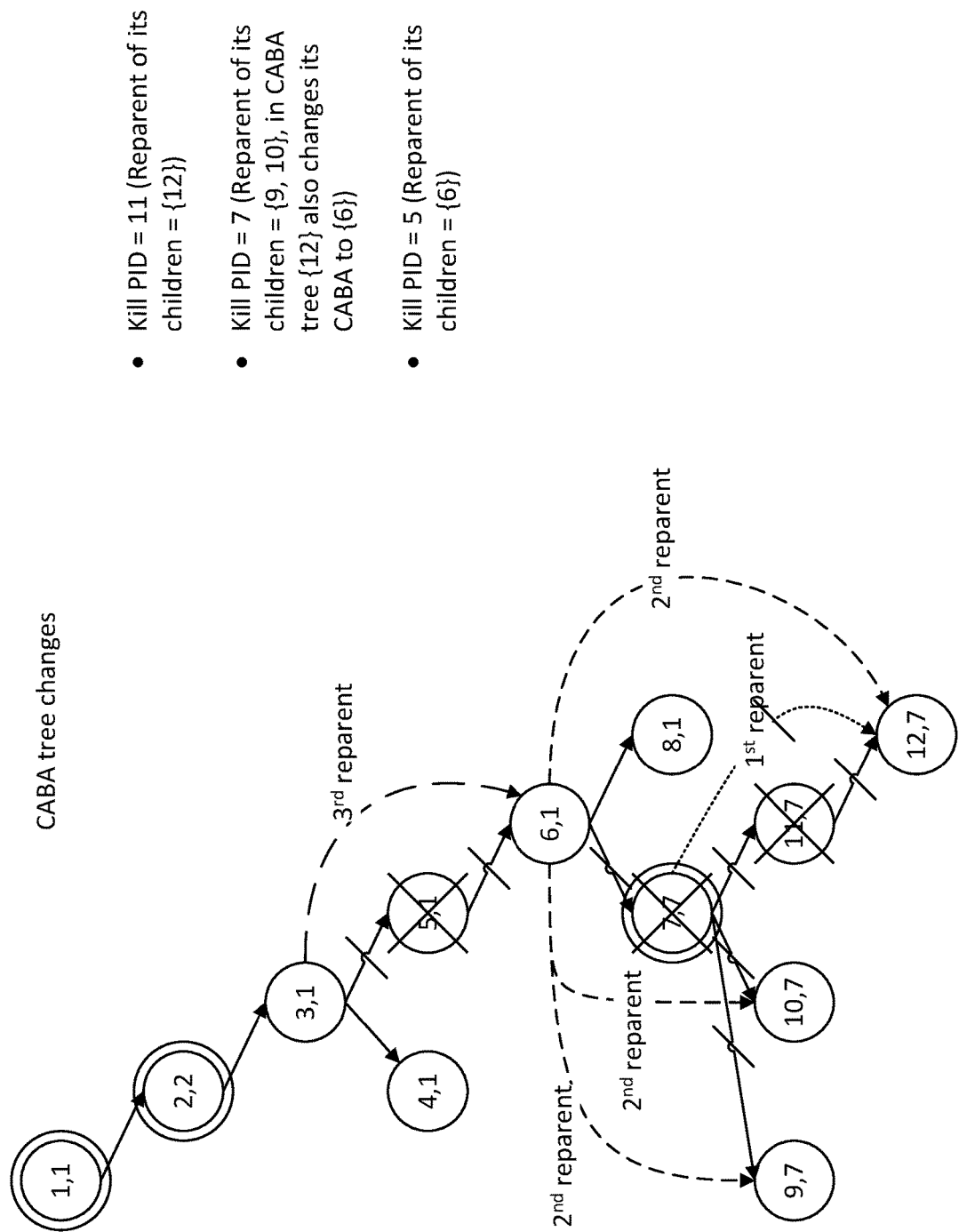
FIG. 4 is a block diagram of CABA tree modifications corresponding to an exemplary first group of processes.

FIG. 4 is a block diagram of CABA tree modifications corresponding to an exemplary first group of processes. In this example, the configuration of processes corresponds to the same configuration of the processes and operation sequence described with reference to FIG. 3. In this configuration 12 processes are created, out of which three processes (i.e., PID 11, PID 7, and PID 5) are terminated.

In the process tree, as described with reference to FIG. 3, all child processes are reparented to the nearest ancestor sub-reaper. However, in the CABA tree, the child process, whose CABA has been terminated, is reparented to its closest alive born ancestor, which now is the CABA of terminated CABA, and not to the sub-reaper.

As shown in FIG. 4, after all processes are created, PID 1 is CABA of PID 2; PID 2 is CABA of PID 3; PID 3 is CABA of PID 4 and PID 5; PID 5 is CABA of PID 6; PID 6 is CABA of PID 7 and PID 8; PID 7 is CABA of PID 9, PID 10 and PID 11; and PID 11 is CABA of PID 12. In the event of termination of the process with PID 11, CABA of PID 12 is changed to the CABA of terminated CABA. So, CABA of PID 12 is changed to PID 7. Then the session leader PID 7 is also terminated, and thus, CABA of PID 12 is changed to CABA of PID 7 which is PID 6. Likewise, PID 7 is the CABA of PID 9 and PID 10. In the event of termination of PID 7, CABA of PID 9 and PID 10 are changed to CABA of PID 7, which is PID 6. Therefore, PID 6 becomes the CABA of the CABD processes (PID 9 and PID 10). After that PID 5 is terminated, so PID 3 becomes a new CABA of the process with PID 6.

In one embodiment, at the checkpoint creation we may collect (e.g., from CABA tree, if available in the system) or identify information about CABA of each process. In one embodiment, the information about CABA of each process may be identified during restore, e.g., using data stored in a checkpoint file.

As described earlier, in one embodiment, the CABA tree is updated when the new processes are created or existing processes are terminated and always shows closest alive ancestors. Therefore, CABA tree stores maximum available information about the real order of process creation without depending on reapers and sub-reapers of the processes.

In one embodiment, the reparenting comprises changing a parent process and/or a CABA process of each thread corresponding to the process of which the parent process and/or the CABA process is being changed. A group of threads appears to be a single node in the process tree and the CABA tree. In such case, the information relating to the process tree and the CABA tree is spread across the data structures of the threads.

In one additional aspect, a CABA in a CABA tree may be the process that initiated creation of the current process. In one example, when creating a process with a CLONE_PARENT argument (e.g., when a thread creates a sibling thread with the same parent in the OS process tree), the caller will become a CABA in the CABA tree for the newly created process. As can be seen in this example, the parent in the process tree and a CABA in the CABA tree may be different for a particular process even right after creation of this particular process.

In another embodiment, if a thread of a process is released and at least one unreleased thread is present, a new CABA for the CABD processes (child nodes in CABA tree) of the released thread is identified as a group leader thread of the process. In one embodiment, a zombie process is also identified as an alive process. The zombie process is a process, which has exited, but has not yet been released.

In one embodiment, the CABA tree is maintained in OS kernel 104 space. In another embodiment, the CABA tree is maintained in OS user space 106. For example, the kernel may provide to user space 106 all needed information for creation of the CABA tree in OS user space 106. CABA tree in user space may be created by creating tracepoints for different operations of the OS kernel process tree, such as fork, clone, wait, exit, etc., per group of processes (e.g., per container).

In one embodiment, for correct restoration of at least one child process of the zombie process, the CABA tree is not updated until a process is released and corresponding data structures are freed. In one example, to handle correct restore of children of zombie processes, a CABA tree may be updated not immediately when the process is killed (e.g., when exit ( ) system call is called by the process), but when the process and its corresponding structures are freed, e.g. (when wait ( ) system call is executed by the OS kernel).

Figure 5:
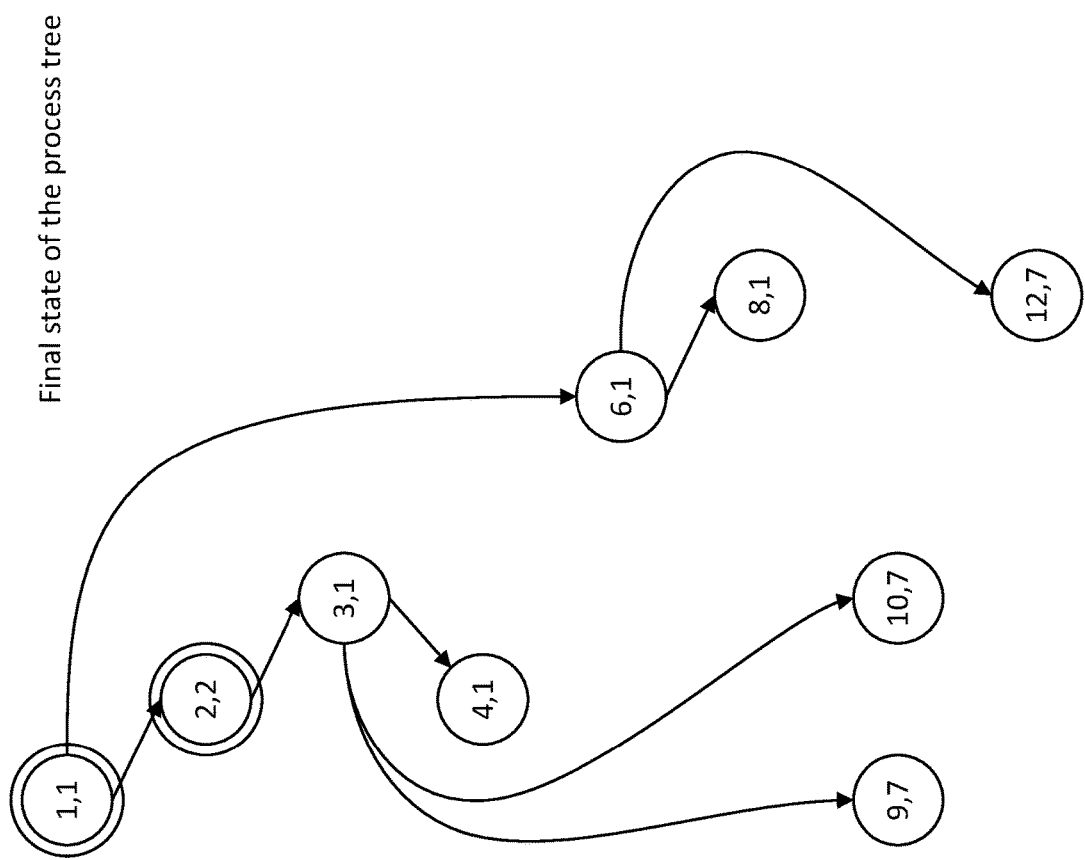
FIG. 5 is a block diagram of the final state of a process tree corresponding to an exemplary first group of processes

FIG. 5 is a block diagram of a final state of the process tree corresponding to an exemplary first group of processes. The process tree, as described with reference to FIG. 3, is modified after termination of three processes and reparenting of their corresponding child processes. As described earlier, child processes PID 9 and PID 10 are reparented, upon termination of their parent process PID 7, to the closest sub-reaper process, i.e., PID 3. Therefore, the processes PID 9 and PID 10 are now child processes of the parent process PID 3. Similarly, upon termination of parent process PID 11, PID 12 is reparented to the closest sub-reaper process, i.e., PID 6. PID 6 becomes a parent to the child process PID 12.

Figure 6:
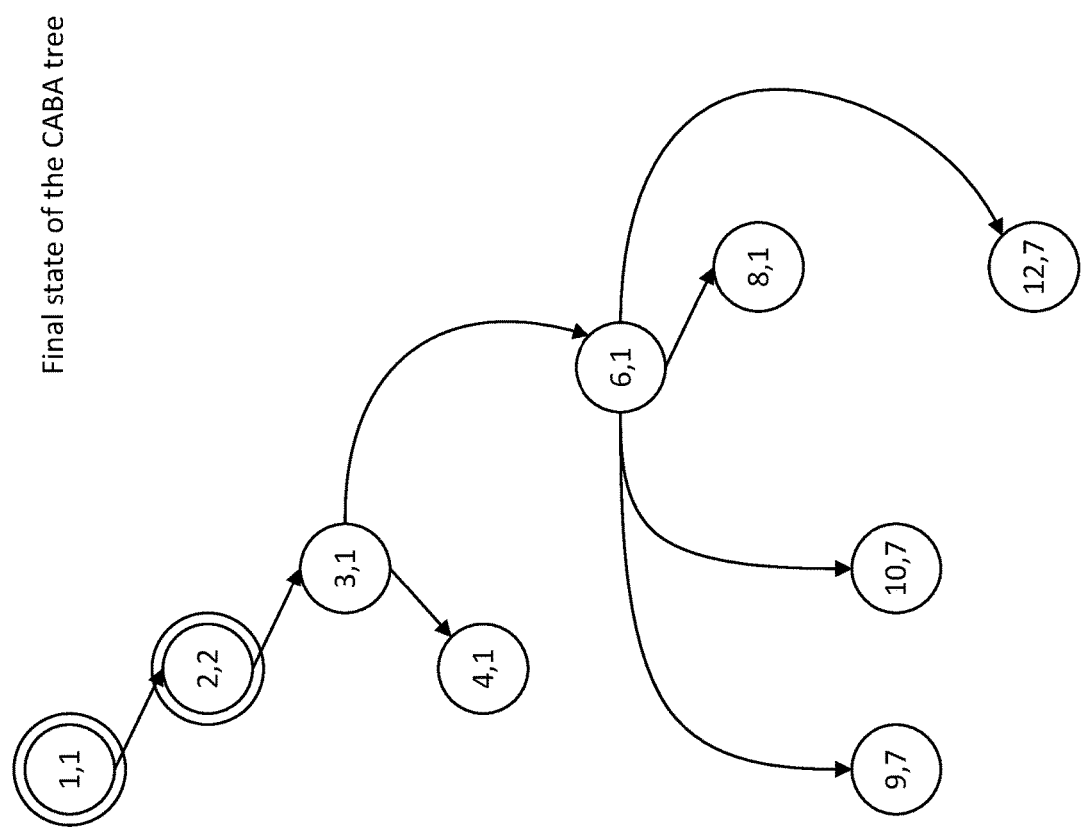
FIG. 6 is a block diagram of the final state of a CABA tree corresponding to an exemplary first group of processes

FIG. 6 is a block diagram of the final state of the CABA tree corresponding to an exemplary first group of processes. The CABA tree, as described with reference to FIG. 4, is modified after termination of three processes and reparenting of their CABD processes (i.e., child nodes in CABA tree). In the CABA tree, child processes are not reparented to the closest sub-reaper, but to the CABA of terminated CABA. CABA of processes PID 9 and PID 10 are changed to the PID 6, which is the CABA of their original CABA 7. Likewise, for PID 12, as its original CABA process PID 11 and its grand-CABA process PID 7 are terminated, PID 6 is the new CABA for PID 12. Therefore, PID 6 becomes the CABA of the process with PID=12.

It is to be noted that, in the process tree, the modification is performed by reparenting the child processes to the current closest sub-reaper. For example, PID 9 and PID 10 are reparented to PID 3. Strict following only this structure will lead to inheritance issues during restore, because it will be difficult to understand the right order of creation of processes and sessions and which process shall create which. Moreover, the child processes would have inherited some properties (e.g., a session) from parent process PID 7. The PID 7 would have inherited from PID 6. Bypassing the grand-parent process PID 6 here, would cause loss of inheritance to PID 9 and 10. On the other hand, in the CABA tree structure, CABA of child processes are changed to the CABA of terminated CABA. For PID 9 and 10, CABA of parent process PID 7 is PID 6. By using information about CABA processes, process tree state and inter-process relationships may be restored correctly even in complicated cases.

Figure 7:
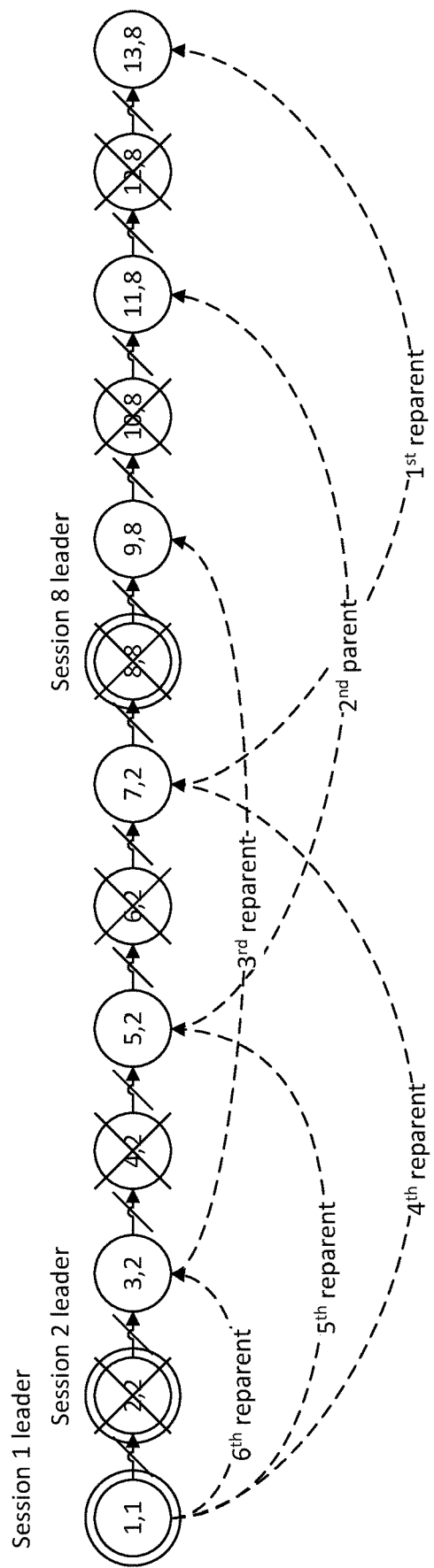
FIG. 7 is a block diagram of process tree modifications corresponding to an exemplary second group of processes.

FIG. 7 is a block diagram of process tree modifications corresponding to an exemplary second group of processes. As shown in FIG. 7, 13 processes are created one by one, out of which PID 1, PID 2, and PID 8, are the session leaders. First, a total of 13 processes are created: a process with Process ID (PID)=1 is a session leader of a session with Session ID (SID)=1; PID 1 created (e.g., by fork ( ) system call) a process with PID 2. PID 2 inherited the session with SID=1, PID 2 then created a new session with SID=2 and thus became a session leader of the session with SID=2. PID 2 then created PID 3 (so PID 3 inherited session 2). PID 3 created process with PID 4 (so PID 4 inherited session 2). PID 4 created process with PID 5 (so PID 5 inherited session 2). PID 5 created a process with PID 6, which inherited the session with SID 2. PID 6 created the process with PID=7, which inherited the session with SID 2. PID 7 created the process with PID=8, which inherited the session 2. PID 8 then created a new session with SID=8 and thus became a session leader of the session with SID=8; after that PID 8 created a process with PID=9. PID 9 created a process with PID=10, PID 10 created a process with PID=11, PID 11 created a process with PID=12 and PID 12 created a process with PID=13. PID 9, PID 10, PID 11, PID 12 and PID 13 inherited the session SID=8. Then, in this example, six processes are terminated (i.e., PID: 12, 10, 8, 6, 4, and 2).

In this example, after all processes were created, PID 7 became a sub-reaper. When PID 12 is terminated (e.g., by receiving a kill command), PID 13 is reparented to the closest sub-reaper, i.e. PID 7, and PID 7 becomes the parent process to PID 13. Then, PID 7 stopped being a sub-reaper, and PID 5 became a sub-reaper. Further, due to termination of PID 10, PID 11 is reparented to the closest sub-reaper, i.e., PID 5. I.e. PID 5 becomes the parent of PID 11. Then, PID 5 stopped being a sub-reaper, and PID 3 became a sub-reaper. After PID 8 is killed, PID 9 is reparented to the closest sub-reaper, i.e., PID 3. Thereby, PID 3 becomes the parent of PID 9. Then, PID 3 stopped being a sub-reaper. PID 1, being the closest reaper, becomes parent to PID 7, to PID 5, and to PID 3, when the processes with PID 6, PID 4, and PID 2 are terminated.

Figure 8:
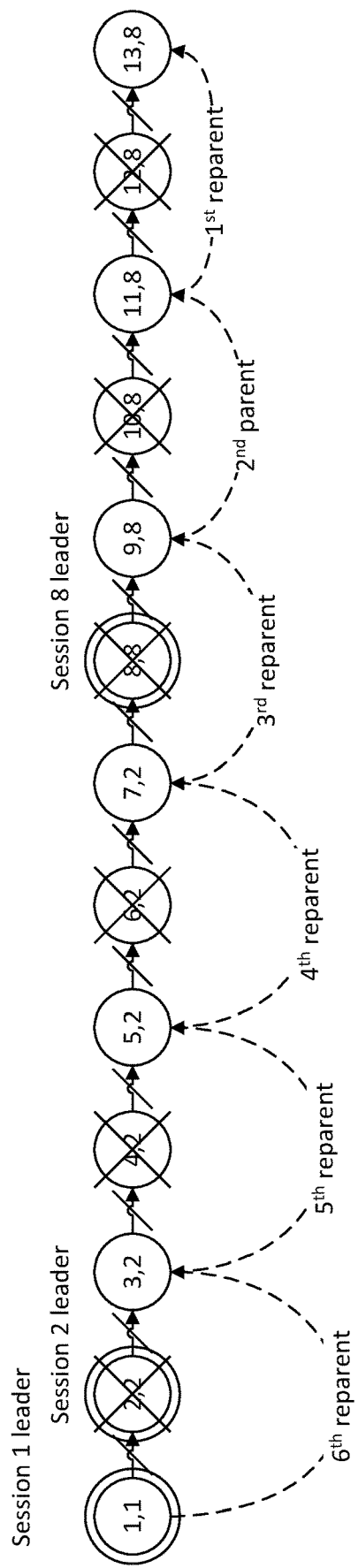
FIG. 8 is a block diagram of CABA tree modifications corresponding to an exemplary second group of processes.

FIG. 8 is a block diagram of CABA tree modifications corresponding to an exemplary second group of processes.

In the event of termination of PID 12, PID 13 is reparented in CABA tree to the closest alive ancestor—PID 11. Similarly, in the event of termination of the process with PID 10, PID 9 becomes the closest alive ancestor of PID 11. Further, in the event of termination of PID 8, PID 7 becomes the closest alive ancestor of PID 9. Furthermore, in the event of termination of PID 6, PID 5 becomes the closest alive ancestor of PID 7. Furthermore, in the event of termination of PID 4, PID 3 becomes the closest alive ancestor of PID 5. Furthermore, in the event of termination of PID 2, PID 1 becomes the closest alive ancestor of PID 3.

Figure 9:
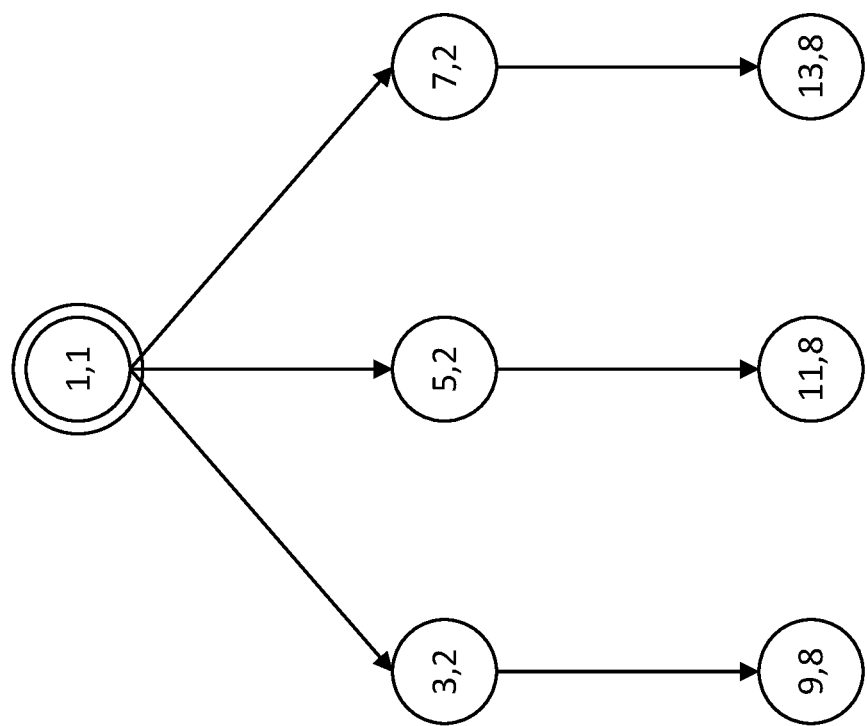
FIG. 9 is a block diagram of a final state of a process tree corresponding to an exemplary second group of processes.

FIG. 9 is a block diagram of a final state of process tree corresponding to an exemplary second group of processes. As described with reference to FIG. 7, PID 13 was reparented to PID 7, PID 11 was reparented to PID 5, PID 9 was reparented to PID 3. Likewise, PID 7, PID 5, and PID 3 were reparented to PID 1. As can be seen, using only the resulting process tree it is difficult to understand how the current state of a set of processes has been achieved and how the sessions have been created. The CABA trees give much better information.

Figure 10:
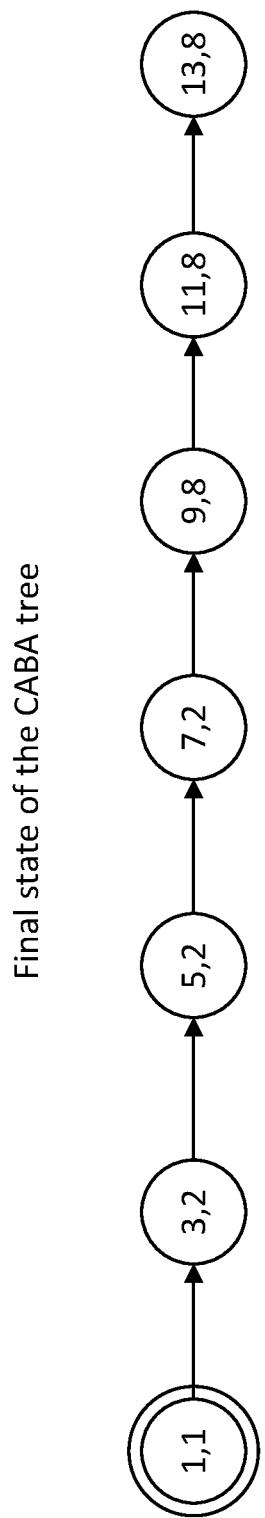
FIG. 10 is a block diagram of a final state of a CABA tree corresponding to an exemplary second group of processes.

FIG. 10 is a block diagram of a final state of a CABA tree corresponding to an exemplary second group of processes. As described with reference to FIG. 8, the CABA tree still shows the order in which the process were created. The example shows: a) how complicated may become process tree, b) how different may be process tree and corresponding CABA tree, c) how close CABA (not comparing to process tree) is to the real order of process creation.

In one embodiment, restoration of processes states is performed similarly to examples shown on FIG. 3-FIG. 10: first all processes are created (including helper processes and helper session leader processes) and then the helper processes and helper session leader processes are killed one by one starting from the leaves so that the reparent operations form the needed structure of the process tree.

Figure 11:
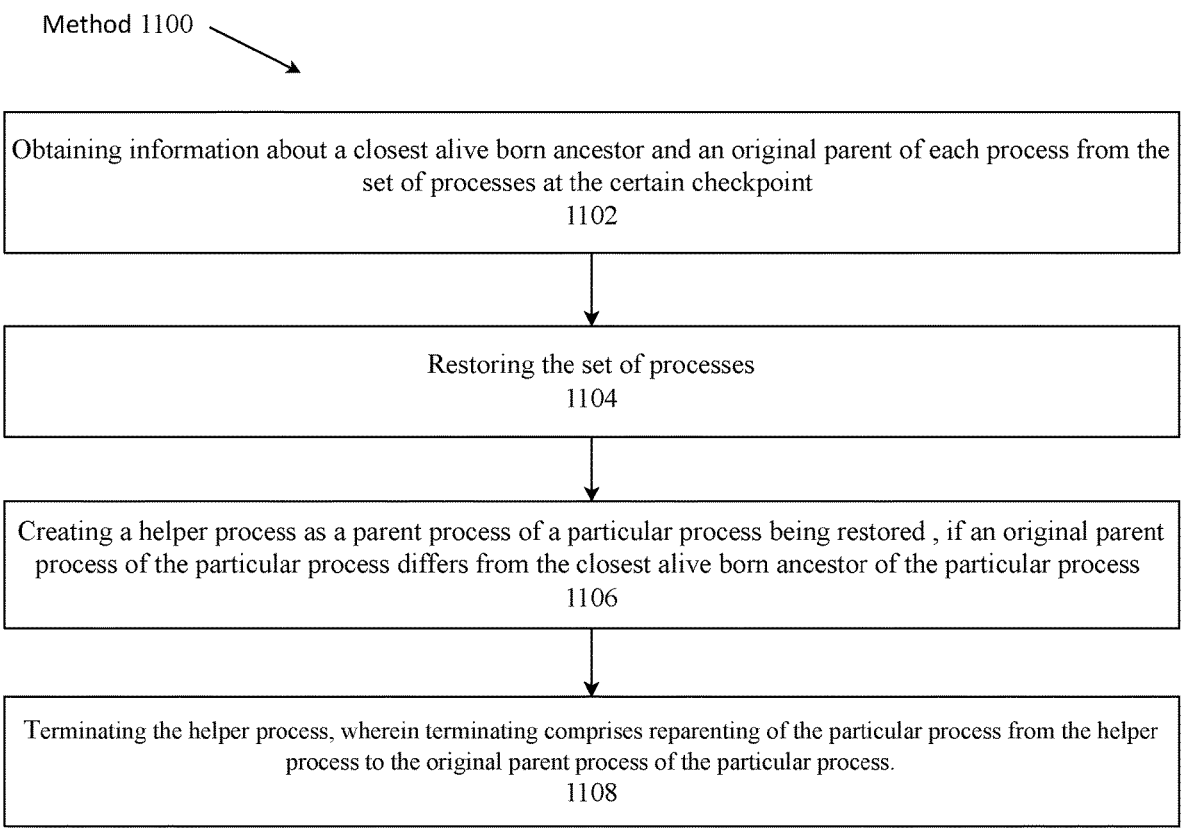
FIG. 11 is a flowchart of a method for restoring a set of processes corresponding to the state of the processes at a certain checkpoint, in accordance with an embodiment.

Referring to FIG. 11, a flowchart of a method for restoring a set of processes on a destination environment corresponding to the state of processes at a certain checkpoint is depicted, according to an embodiment. In an embodiment, processes have parent-child relationships and processes belong to at least one session. In an embodiment, the OS (e.g., OS kernel) includes at least two data structures related to the processes as they run on a source environment restoration of processes states (e.g., which may be a part of live migration): a process tree and a CABA tree.

At method operation 1102, information about a closest alive born ancestor and an original parent of each process from the set of processes at the certain checkpoint is obtained.

At method operation 1104, the processes are restored. E.g., the new processes are created corresponding to the processes that have been live at the certain checkpoint.

At method operation 1106, a helper process is created as a parent process, if an original parent process of the particular process from the process tree differs from the CABA of the particular process from the CABA tree.

At method operation 1108, the helper process is terminated. In an embodiment, terminating comprises reparenting of the particular process from the helper process to the original parent process of the particular process.

In some embodiments, though not depicted, the method 1100 comprises creating a helper session leader as a child process of the closest common alive born ancestor of session processes, if the session does not have a session leader. The operation of creating the helper session leader further comprises creating a session by the helper session leader and creating by the helper session leader at least one child process, when the child process also belongs to the session or when the child process has at least one session process as a descendant, so the helper session leader becomes a parent process of at least one child process of the closest common alive born ancestor of session processes.

In some embodiments, though not depicted, the method 1100 further comprises the operation of assigning an original parent process of a particular process as a sub-reaper for reparenting of the particular process before terminating the helper process, wherein the helper process is the current parent process of the particular process.

Figure 12:
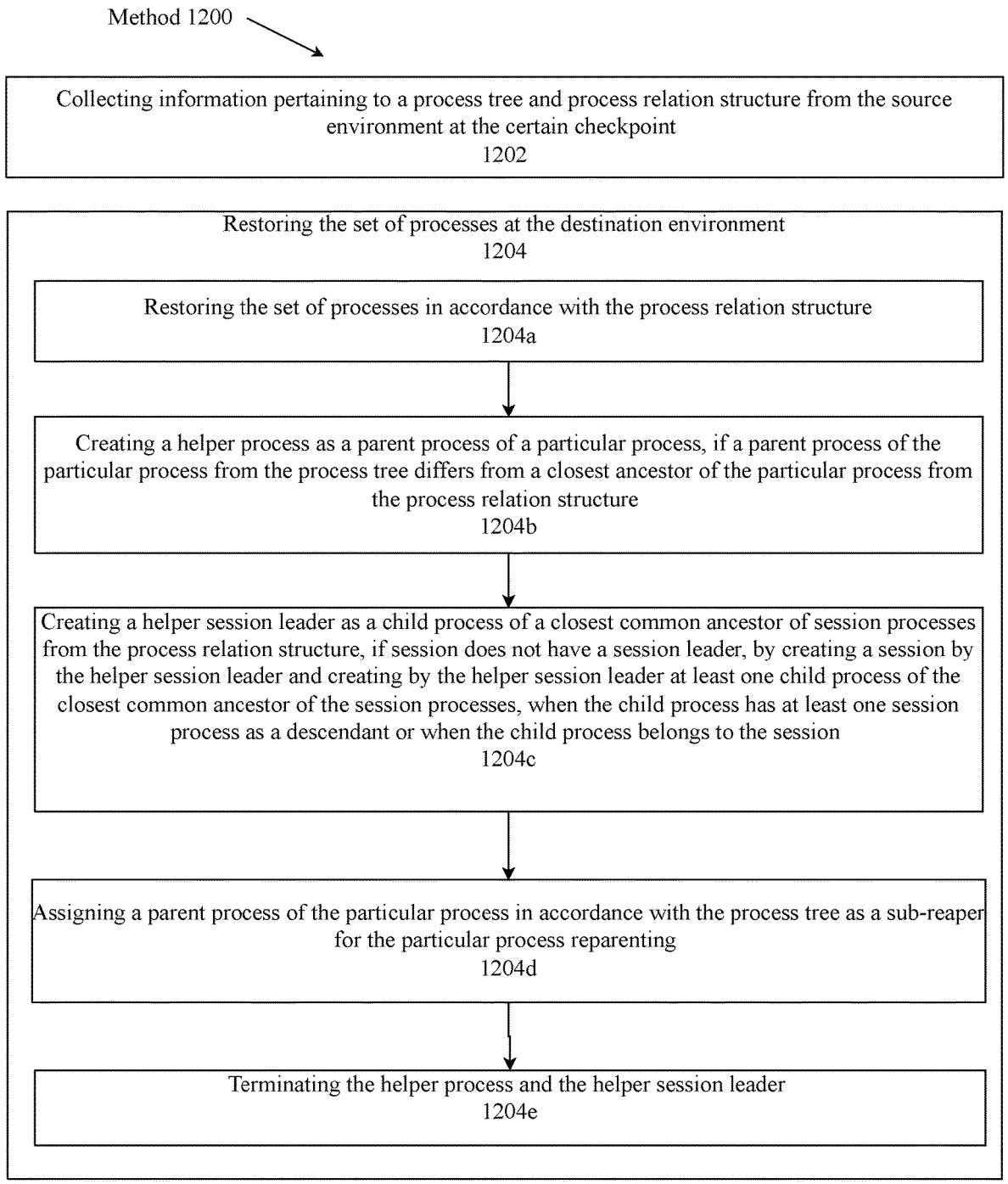
FIG. 12 is a flowchart of a method for restoring a set of processes and sessions corresponding to the state of the processes at a certain checkpoint, in accordance with an embodiment.

FIG. 12 is a flowchart of a computer implemented method for restoring a set of processes on a destination environment corresponding to a state of the processes from a source environment at a certain checkpoint. In one embodiment, the processes have parent-child relationships and processes belong to at least one session.

At method operation 1202, information pertaining to a process tree and process relation structure is collected (e.g., collected at a certain checkpoint creation, or got from a received checkpoint file, etc.).

At method operation 1204, the processes are restored (e.g., at the destination environment). The restoration is achieved by restoring, at operation 1204*a*, processes in accordance with the process relation structure; creating, at operation 1204*b*, a helper process as a parent process of a particular process, if a parent process of the particular process from the process tree differs from a closest ancestor of the particular process from the process relation structure; creating, at operation 1204*c*, a helper session leader as a child process of a closest common ancestor of session processes form the process relation structure, if session doesn't have a session leader. The operation of creating the helper session leader further comprises creating a session by the helper session leader; and becoming by the helper session leader a parent process of at least one child process of the closest common ancestor of session processes (e.g., creating the child process by the helper session leader process), when the child process has at least one session process as a descendant and/or when the child process is the session process itself. At operation 1204*d*, an original parent process of a particular process (e.g., as was stated in a process tree) is assigned in accordance with the process tree as a sub-reaper for the particular process reparenting made on the next step and caused by killing of the helper process, where the helper process is a temporary parent process of the particular process. At operation 1204*e*, the helper process and the helper session leader are terminated. In some cases, other sub-reapers, if they exist between the process that shall be reparented and the process to which it shall be reparented, are made not sub-reapers. In one aspect, when a helper session leader is being killed, its child processes are reparented to CABA of the helper session leader. So that after all reparent operations are completed, the original configuration of the process tree is achieved.

In some embodiments, the method 1200 implements the process relation structure as a closest alive born ancestor (CABA) tree, wherein each node of the CABA tree describes a process, characterized by process id and session id, and wherein relation of the nodes of the CABA tree characterizes a real order of process creation.

In one embodiment, the method 1200 implements each node of the CABA tree as including information about the threads of the process corresponding to the node.

In some embodiments, the method 1200 implements the closest alive born ancestor of the node in the CABA tree as a closest alive born ancestor for all threads of the process corresponding to the node.

In some embodiments, the method 1200 comprises the operation of restoring the processes which further comprises creating threads in accordance with process relation structure.

In some embodiments, the method 1200 comprises that the processes being reparented becomes a child process of the first alive thread of the sub-reaper.

In some embodiments, the method 1200 further comprises the operation of forming the CABA tree from the start of the first process of the group until the certain checkpoint. The CABA tree is formed by creating a new node of the CABA tree, when the new process is created, where the closest alive born ancestor of the new node is a parent process of the new process and/or a process that has created the new process; and deleting the node, when the corresponding process is killed, wherein the closest alive born ancestor of the deleted node becomes the closest alive born ancestor of the nodes corresponding to the closest alive born descendants of the killed process.

In one embodiment, the method 1200 implements the CABA tree as maintained in user space of the source environment and/or the destination environment. In one embodiment the CABA tree is implemented in the kernel space of the source environment and/or the destination environment.

In some embodiments, the method 1200 includes the operation of deleting the node in the CABA tree after the killed process identifier is freed.

In some embodiments, the method 1200 environment is at least one of a container, a virtual machine, or a hardware server.

In another embodiment, during restore, control groups and other attributes analogous to respective sessions are also fixed.

The invention claimed is:

1. A computer implemented method for restoring a set of processes corresponding to a state of the set of processes at certain checkpoint, wherein processes have parent-child relationships, and wherein processes belong to at least one session, the method comprising:
    obtaining information about a closest alive born ancestor and an original parent of each process from the set of processes at the certain checkpoint;
    restoring the set of processes;
    creating a helper process as a parent process of a particular process being restored, if an original parent process of the particular process differs from the closest alive born ancestor of the particular process; and
    terminating the helper process, wherein terminating comprises reparenting of the particular process from the helper process to the original parent process of the particular process.

2. The method of claim 1, further comprising:
    creating a helper session leader as a child process of the closest common alive born ancestor of session processes, if the session does not have a session leader, including:

creating a session by the helper session leader, and creating by the helper session leader at least one child process of the closest common alive born ancestor of the session processes, when the child process has at least one session process as a descendant or when the child process belongs to the session.

3. The method of claim 1, wherein each process in the set of processes was alive at the certain checkpoint.

4. The method of claim 1, further comprising:
assigning an original parent process of the particular process as a sub-reaper for reparenting of the particular process before terminating the helper process, wherein the helper process is currently a parent process of the particular process.

5. A computer implemented method for restoring a set of processes on a destination environment corresponding to a state of the set of processes from a source environment at a certain checkpoint, wherein processes have parent-child relationships, and wherein processes belong to at least one session, the method comprising:
collecting information pertaining to a process tree and process relation structure from the source environment at the certain checkpoint;
restoring the set of processes at the destination environment including:
restoring the set of processes in accordance with the process relation structure;
creating a helper process as a parent process of a particular process, if a parent process of the particular process from the process tree differs from a closest ancestor of the particular process from the process relation structure;
creating a helper session leader as a child process of a closest common ancestor of session processes from the process relation structure, if session does not have a session leader, including:
creating a session by the helper session leader, and
creating by the helper session leader at least one child process of the closest common ancestor of the session processes, when the child process has at least one session process as a descendant or when the child process belongs to the session,
assigning a parent process of the particular process in accordance with the process tree as a sub-reaper for the particular process reparenting, wherein the helper process is currently a parent process of the particular process, and
terminating the helper process and the helper session leader.

6. The method of claim 5, wherein the process relation structure is a closest alive born ancestor (CABA) tree, wherein each node of the CABA tree describes a process, characterized by process id and session id, and wherein relation of the nodes of the CABA tree characterizes a real order of process creation.

7. The method of claim 6, wherein each node of the CABA tree comprises information about threads of the process corresponding to the node.

8. The method of claim 7, wherein a closest alive born ancestor of the node in the CABA tree is a closest alive born ancestor for all threads of the process corresponding to the node.

9. The method of claim 5, wherein restoring the set of processes further comprises creating threads in accordance with the process relation structure.

10. The method of claim 5, wherein the particular processes being reparented becomes a child process of a first alive thread of the sub-reaper.

11. The method of claim 6, further comprising:
forming the CABA tree from a start of a first process in the set of processes until the certain checkpoint by:
creating a new node of the CABA tree, when a new process is created, wherein the closest alive born ancestor of the new node is a parent process of the new process and/or a process that has created the new process; and
deleting the node, when the corresponding process is killed, wherein the closest alive born ancestor of the deleted node becomes the closest alive born ancestor of the closest alive born descendants of the deleted node in the process relation structure.

12. The method of claim 11, wherein the CABA tree is maintained in user space of the source environment.

13. The method of claim 11, wherein deleting the node is performed after a killed process identifier is freed.

14. The method of claim 5, wherein the environment is at least one of a container, a virtual machine, or a hardware server.

15. A system for restoring a set of processes corresponding to a state of the set of processes at certain checkpoint, wherein processes have parent-child relationships, and wherein processes belong to at least one session, the system comprises:
at least one processor configured to:
collect information about a closest alive born ancestor and an original parent of each process from the set of processes at the certain checkpoint,
restore the set of processes, wherein each process of the set of processes was alive at the certain check point,
create a helper process as a parent process of a particular process being restored, if an original parent process of the particular process differs from the closest alive born ancestor of the particular process, and
terminate the helper process, wherein terminating comprises reparenting of the particular process from the helper process to the original parent process of the particular process.

16. The system of claim 15, wherein process relation structure is a closest alive born ancestor (CABA) tree, wherein each node of the CABA tree is a process, characterized by process id and session id, and wherein relation of the nodes of the CABA tree characterizes a real order of process creation.

17. The system of claim 16, wherein each node of the CABA tree comprises information about threads of the process corresponding to the node.

18. The system of claim 17, wherein the closest alive born ancestor of the node of the CABA tree is a closest alive born ancestor for all threads of the process corresponding to the node.

19. The system of claim 15, wherein the at least one processor is further configured to create threads in accordance with the process relation structure.

20. The system of claim 19, wherein the reparented process is created as a child process of a first alive thread of the sub-reaper.

21. The system of claim 16, wherein the at least one processor is further configured to form the CABA tree from a start of the first process in the set of processes until the certain checkpoint including by:

creating a new node of the CABA tree, when a new process is created, wherein the closest alive born ancestor of the new node is a parent process of the new process and/or a process that has created the new process; and deleting the node, when the corresponding process is killed, wherein the closest alive born ancestor of the deleted node becomes the closest alive born ancestor of the closest alive born descendants of the deleted node in the process relation structure.

* * * * *